Nov. 6, 1923.
J. A. BOWDEN
PRESSURE GAUGE
Original Filed March 21, 1918
1,473,171
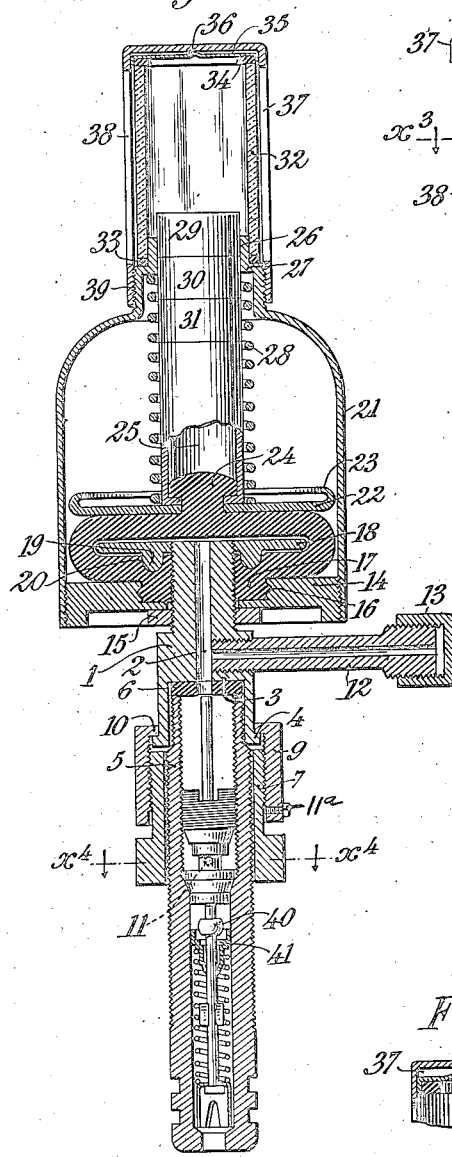
Fig. 1.
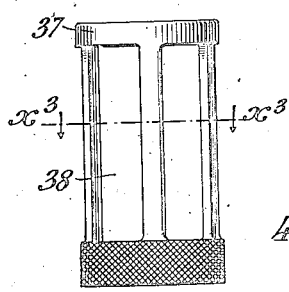
Fig. 2.
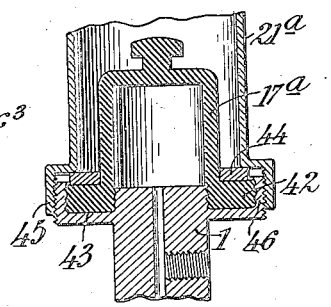
Fig. 5.
Fig. 3.
Fig. 4.
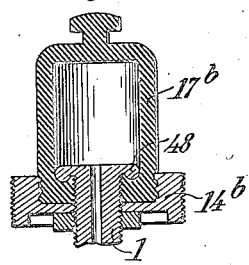
Fig. 6.
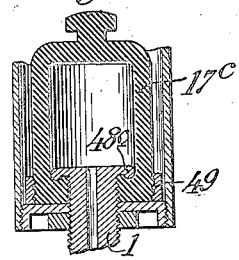
Fig. 7.
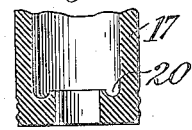
Fig. 9.
Fig. 8.
INVENTOR
Junius A. Bowden,
By Attorneys,
WITNESS:

Patented Nov. 6, 1923.

1,473,171

UNITED STATES PATENT OFFICE.

JUNIUS A. BOWDEN, OF LOS ANGELES, CALIFORNIA, ASSIGNOR TO A. SCHRADER'S SON, INCORPORATED, OF BROOKLYN, NEW YORK, A CORPORATION OF NEW YORK.

PRESSURE GAUGE.

Application filed March 21, 1918, Serial No. 223,837. Renewed April 13, 1923.

*To all whom it may concern:*

Be it known that I, JUNIUS A. BOWDEN, a citizen of the United States of America, residing in Los Angeles, in the county of Los Angeles and State of California, have invented certain new and useful Improvements in Pressure Gauges, of which the following is a specification.

This invention relates to pressure gauges adapted for indicating the pressure in pneumatic tires and comprises a device which is adapted to be secured and retained on the tire while the tire is in use so that the pressure gauge will constantly indicate the amount of pressure in the tire.

The device embodies a gauge bar, operable longitudinally of the device, which is visible to the eye and by means of which the pressure is indicated, and one of the important objects of the present invention is to provide a transparent enclosure for this gauge bar which will keep out dust and water.

The device also embodies a rubber expansible member which is acted on by the air pressure, and a further object of the invention is to provide means for forming an airtight connection between the rubber member and metal body to which it is connected. A further object is to provide improved means for securing the gauge bar to this rubber member.

Another object of the invention is to provide an improved means for securing the pressure gauge to the valve stem of the tire whereby a quick connection or disconnection may be made and yet a perfect air-tight union effected.

Other minor objects and advantages and details of construction will be brought out in the following description.

Referring to the drawings:—

Figure 1 is an enlarged longitudinal section through the device and through the tire valve to which it is attached.

Fig. 2 is a side elevation in detail of the protecting device for the transparent enclosure.

Fig. 3 is a section on line $x^3$—$x^3$ Fig. 2.

Fig. 4 is a section on line $x^4$—$x^4$ Fig. 1.

Fig. 5 is a modified form of connection between the rubber air chamber and metallic body.

Fig. 6 shows another form of connection between the rubber air chamber and metallic body.

Fig. 7 shows another form of connection between the rubber air chamber and metallic body.

Fig. 8 is a longitudinal sectional view through the lower portion of the rubber air chamber.

Fig. 9 is an enlarged cross section of the disk 35 for holding the transparent guard in place.

1 designates the body portion of the device which has a central air passage 2, a chambered lower end 3 with an outwardly projecting flange 4. The chambered portion 3 is slipped over the outer end of the tire valve casing 5 and a rubber washer 6 is arranged within the chambered portion 3 to bear against the edge of the valve casing 5 and prevent air leakage. A sleeve 7 with flattened sides is slipped over the threaded portion of the valve casing 5 without engaging the threads thereof, the flat portions 8 of the sleeve engaging the flat portions of the valve casing 5 so that the sleeve 7 is non-revoluble. The sleeve 7 is externally threaded and screwed thereon is a nut 9 having an inwardly directed flange 10 which engages the flange 4. A set screw 11 is provided in the sleeve 7 to engage one of the flat sides of the valve casing 5 and a slight turn of the set screw 11 frees the sleeve 7 and permits the latter to be quickly withdrawn, together with all attached parts of the gauge. In replacing the gauge the sleeve 7 is slipped down until the washer 6 rests on the edge of the valve casing, then the set screw 11 is tightened and then the nut 9 may be given one or two turns to tightly squeeze the washer 6. This method of attachment may be accomplished very quickly and is a great advantage over other methods in use with this form of valve because the valve is constructed with a very fine thread and a great many revolutions of the attaching screw are necessary to traverse the thread the distance sufficient to attach the gauge device. A lateral stem 12 is screwed to the body and has a closure cap 13 and affords means for the application of the tube for inflating the tire. 11$^a$ is a set screw which extends through the nut 9 and is adapted to engage the exterior smooth wall of the sleeve 7, and when the set screw 11$^a$ is tightened it prevents accidental rotation of the nut 9 and consequent loosening of the gauge.

Slidable on the threaded upper end of the body 1 is a disk 14 below which is a nut 15. The disk 14 is recessed in its upper face and has a recess 16. The recessed portion of the disk 14 receives the lower end of a rubber air chamber 17, the lower end of the latter being locked in intimate engagement with the threaded portion of the body 1 and the recess 16 by a flange 18 which is screwed to the body 1 and which has a downwardly projecting annular rib 19 which is received in an annular concave groove 20 in the rubber air chamber 17, as shown in Fig. 8. In assembling the parts of the device the lower end of the air chamber is placed over the disk 18 by stretching the air chamber. The rib 19 is slightly larger than its corresponding groove in the air chamber 17, thereby making a closer fit and better air-tight joint. The nut 15, acting against the disk 14, forces the lower flange of the air chamber 17 tightly against the flange 18.

Screwed to the disk 14 is a barrel 21 which has a contracted upper end, and slidable within the barrel 21 is a plate or follower 22 with a curled rim 23 which slides against the wall of the barrel 21 and is thereby held centrally.

The rubber air chamber 17 has a boss or head 24 which projects through the follower 22 and also into the lower end of a hollow gauge bar 25. The follower 22 holds the lower end of the gauge bar 25 centrally while the other end of the gauge bar is guided by a guide 26 formed on the upper end of the barrel 21. Immediately below the guide 26 the barrel is offset to form a shoulder 27 against which a coil spring 28 rests, the lower end of the spring 28 resting against the follower 22. The spring 28 tends to depress the follower 22 and air chamber 17 in opposition to whatever air pressure is within the air chamber 17 so that the gauge bar 25 will stand in a position corresponding.

The gauge bar is divided into a series of sections 29, 30 and 31 or more and each section designates a certain pressure within the air chamber 17. I prefer to color the sections with different colors thus, section 29 may be red, section 30 may be green, section 31 may be yellow, and so on, whereby a person can tell from a considerable distance what the pressure is. The color of the section can be seen from a much greater distance than could a numeral indicating pressure in pounds, and when it is known that each color corresponds to a definite pressure it is only necessary for the person to note the innermost color which appears to view in order to know what the pressure is.

In order to protect the gauge bar and prevent the entrance of water or dust I employ a transparent tube 32 of any desired material such as glass, the lower end of the tube bearing against a gasket 33 and the upper end bearing against a gasket 34, the gasket 34 being surmounted against a dished disk 35, the projecting central portion 36 of the disk receiving pressure from a protector comprising a perforated shield 37 which has openings 38 through which the position of the gauge bar may be seen. The shield 37 is screwed to the contracted portion 39 of the barrel 21.

The valve which is herein shown within the valve casing 5 is what is well known in the art as the Schrader universal valve and detail description thereof is unnecessary.

When the pressure gauge is attached to the valve casing it is necessary that the gauge be in communication with the air pressure within the tire and heretofore it has been customary to depress the valve stem and open the valve when the pressure gauge is applied. In the present case, however, I provide for the necessary constant air communication by forming a slow leak which enables the air to pass outwardly very slowly through the valve. This is done by simply removing the rubber packing in the face of the valve 41 whereby the metal parts 40 and 41 seat directly against each other and the contracting portions are not air-tight, so that air leaks through.

When the pressure of air expands the air chamber 17 it forces up the upper portion of the air chamber, raising the follower 22 and gauge bar 25, and the flange 18 keeps the air chamber expanded radially while the rib 19 of the flange positively holds the lower end of the air chamber firmly in its seat in the disk 14, thereby making a strong air-tight joint. The rib 19 prevents outward radial movement of that part of the air chamber with which it interlocks, as does also the recess in the disk 14, while the ribs 16 prevent the upward movement of the rubber at that point. The flange 17 of the air chamber is thus confined in a pocket of limited size and is positively prevented from spreading. The follower 22 which engages the head 24 always holds the air chamber in a proper central position irrespective of the amount of expansion of the air chamber, and as the follower slides freely in the barrel 21 it offers no resistance which would detract from the accuracy of the gauge.

In the form shown in Fig. 5 I have illustrated how the lower portion of the air chamber 17ª may be formed with an outwardly projecting flange 42, while the upper portion of the body 1 of the gauge may be formed with an annular recess 43 to entirely receive the flange 42 and lower part of the chamber 17ª. A washer 44 rests upon the upper face of the flange 42. The barrel 21ª has an expanded flange 45 which is screwed outside of a flange 46 formed on the body 1.

In the form shown in Fig. 6 the air chamber 17ᵇ is constructed similar to that in Fig. 1, but the body 1 has an integral flange 48 which takes the place of the spreader 18 in Fig. 1 and engages the annular groove 20 of the air chamber.

In Fig. 7 the construction is very similar to that of Fig. 6, except that a band 49 encircles the lower flange portion of the air chamber 17ᶜ, preventing the spreading or reducing of the thickness of the flange, and holds its groove 20 under the head 48ᶜ and keeps the lower portion of the air chamber in air-tight contact with the body 1.

Certain features of construction herein shown are claimed in prior applications filed by me, Serial Nos. 560,796 and 581,673.

What I claim is:—

1. In a pressure gauge, a body, a rubber air chamber secured at one end to the body and being imperforate except at such end, said air chamber having an integral boss projecting from said chamber at its imperforate outer end, a gauge bar, means for securing the said gauge bar to the boss, and means for resisting outward movement of the gauge bar.

2. In a pressure gauge, a body, a flange on said body, said flange having an annular downwardly directed rib, a disk surrounding the body and provided with an annular recess, and a rubber air chamber with a part fitting in the flange on said body and its recess, said part having an annular groove which receives said rib, and means for holding the contiguous part of said air chamber closely against said rib.

3. In a pressure gauge, a body, a rubber air chamber on said body, means resisting the expansive force of air in said air chamber, a gauge bar having an operative engagement with said air chamber, a barrel enclosing the air chamber, said gauge bar being slidable through the barrel, a transparent tube on the end of said barrel adapted to receive the end of said gauge bar, a cylindrical shield secured to the barrel and protecting said transparent tube, said shield having segmental openings, packing at each end of the tube, and a disk between the outer packing and end of the shield, said disk having a central projection bearing against the end of the shield.

4. As a new article of manufacture for a pressure gauge, a cylindrical rubber air chamber having an imperforate integral flanged boss in the center of one end thereof, and open at the other end.

5. In a pressure gauge, a body, a rubber air chamber secured to the body and having an integral boss on its outer end, a gauge bar, a plate against which the upper end of said air chamber bears, said gauge bar being provided with an opening, said boss passing through said opening, and means for resisting the outward movement of the gauge bar.

In witness whereof I have hereunto signed my name.

JUNIUS A. BOWDEN.